INVENTORS
WILLIAM J. BOYLE, JR
LAUREN R. DAVIS
TEVIS SHUSMAN
BY John W. Klooster
ATTORNEY

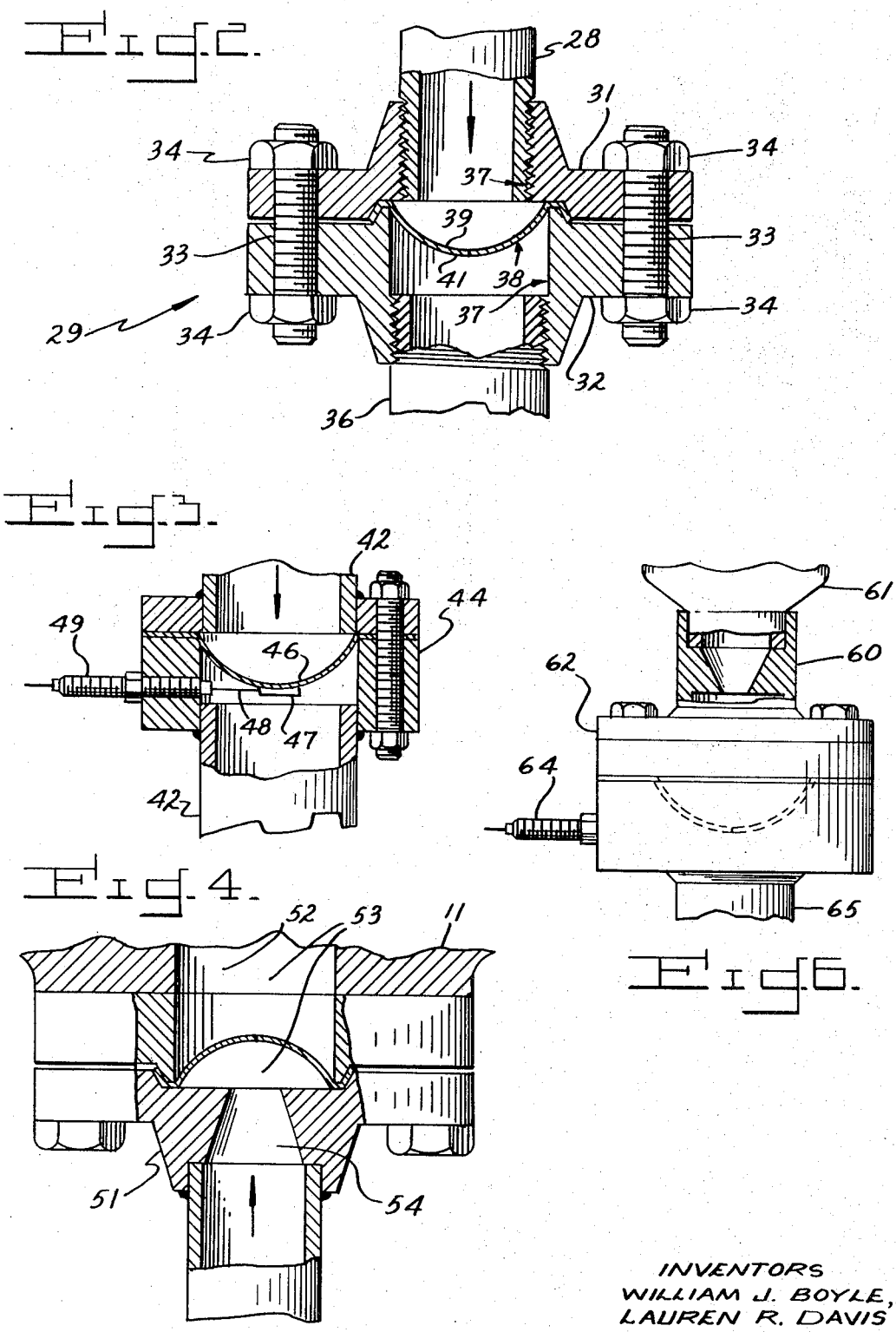

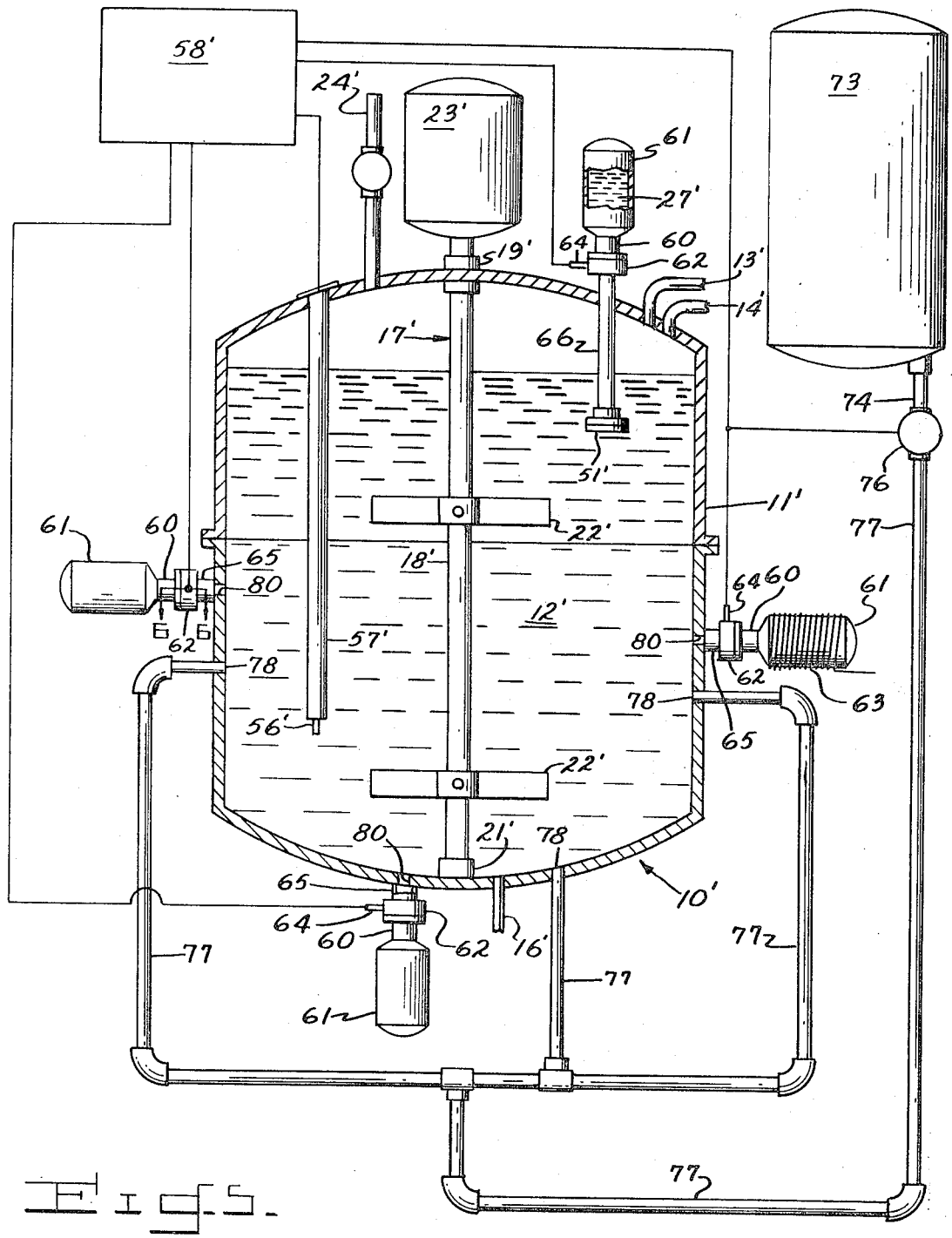

United States Patent Office 3,557,243
Patented Jan. 19, 1971

3,557,243
AUTOMATIC INDEPENDENTLY FUNCTIONING SPARGING APPARATUS
William J. Boyle, Jr., Springfield, Lauren R. Davis, Ludlow, and Tevis Shusman, Longmeadow, Mass., assignors to Monsanto Company, St. Louis, Mo., a corporation of Delaware
Filed Feb. 23, 1968, Ser. No. 707,927
Int. Cl. C07b 29/00; B01j 1/00, 3/00
U.S. Cl. 260—698                                    4 Claims

ABSTRACT OF THE DISCLOSURE

An automatic sparging apparatus for admixing reaction retardant chemicals with a liquid reaction mixture of reactants and reaction products in a pressurizable reactor, and associated methods for using the same.

BACKGROUND

In the various arts of manufacturing chemicals in pressurizable reactors, or pressurizable kettles, as they are sometimes called, containing a liquid mixture of reacting reactants and products formed therefrom, a common critical problem is how to stop such reactions therein abruptly or controllably, as when a desired predetermined reaction end point has been reached, or as when a set of excessive or prohibitive reaction conditions are about to occur.

Heretofore, such a stoppage has been achieved by the addition of a material to such a liquid mixture of reactants and reaction products in a reactor. Such a material is chosen so as to in some way chemically or physically suppress, stop short, terminate or prevent further reactions from occurring; herein such materials are collectively termed retardants. Regardless of the nature of the mixture in the reactor, or of the retardant being added, all heretofore known means employed for such retardant addition involve only surface addition (that is, merely dumping, as by gravitational force) a retardant into a liquid reactant/reaction product mixture.

Now, as those skilled in the art fully appreciate, all reactors in which a liquid reactant/reaction product mixture are processed are equipped with means for mixing such liquid mixture to prevent excessive localized hot spots from developing therein and to promote uniformity of reaction therein. Typically, such mixing means utilizes blades or fins mounted upon a rotatable shaft within the reactor and the shaft is revolved by a powerhead externally mounted near or on the reactor. Such mixing is relied upon universally to admix with adequate rapidity a given retardant with a given reactant/reaction product mixture once such retardant is surface added or released interiorly of a reactor by a retardant addition means.

So long as the mixing means is functioning normally, the desired mixing of retardant with reactant/reaction products mixture takes place in the expected intended, predictable, predetermined manner. However, should the mixing means cease to function (such as would occur through power failure), such desired mixing does not occur, and process failure results, possible disastrously to equipment, chemicals, and, most importantly, personnel. If a retardant is added to a reactant/reaction product mixture at this point when the mixing means is not functioning by mere conventional surface addition procedures, little or no appreciable intermixing of retardant with reactant/reaction product mixture can occur, and this is at the very time when retardant action is most critically needed. So far as is known, no retardant addition means known to the prior art has had incorporated thereinto, as an integral part thereof, independent means for mixing a retardant with a reactant/reaction product mixture in a fail-safe manner independently of whether or not the reactor mixing means is functioning, or operating.

By the present invention, there is provided new and very useful independently functioning sparging system adapted for use with a pressurizable reactor whereby either while a retardant is being added to a reactant/reaction product mixture in such reactor or afterwards, the resulting composition comprising retardant and reactant/reaction product mixture is automatically agitated by sparging so as to achieve thereby a degree of mixing of such retardant with such mixture which is completely unattainable using only surface addition of such retardant with such mixture alone. The result is a very great improvement in capacity to abruptly stop a reaction in a pressurizable reactor.

DESCRIPTION OF THE DRAWINGS

The invention is further illustrated by the attached drawings wherein:

FIG. 2 is a vertical sectional view taken through the region 2–2 of FIG. 1 illustrating construction of a deluge valve suitable for use in this invention;

FIG. 3 is a vertical sectional view taken through the region 3–3 of FIG. 1 illustrating construction of another deluge valve suitable for use in this invention;

FIG. 4 is a vertical sectional view taken through the region 4–4 of FIG. 1 illustrating construction of still another deluge valve suitable for use in this invention;

FIG. 5 is a view similar to FIG. 1, but illustrating an alternative embodiment of the invention; and FIG. 6 is a vertical sectional view taken through the region 6–6 of FIG. 5 illustrating construction of an integrally mounted and assembled deluge valve, pressurizable reservoir means, and interconnecting means.

SUMMARY

Figure 1:
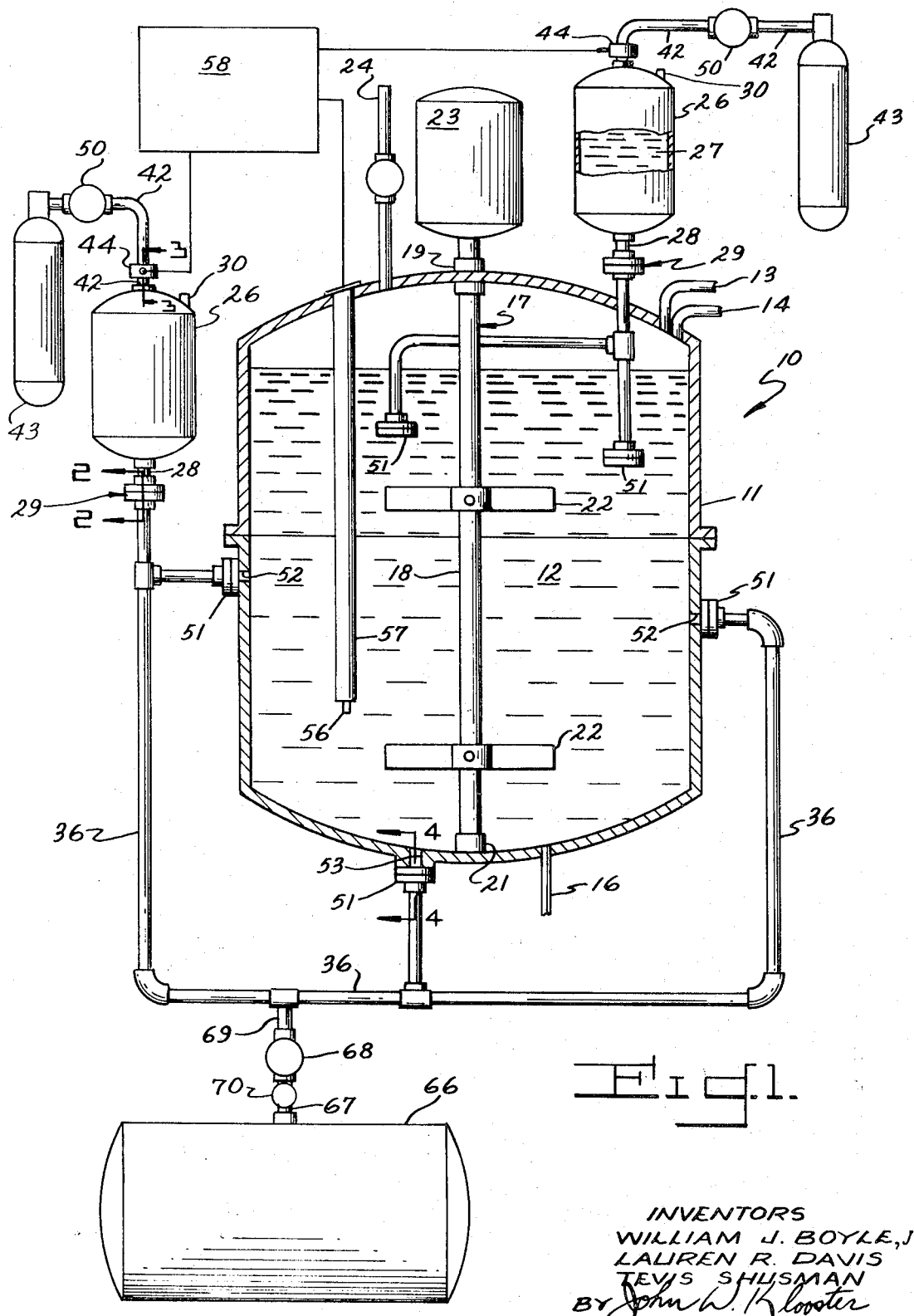
FIG. 1 is a side elevational view with some parts shown in section and some parts broken away of an embodiment of the invention with a reactor assembly.

This invention is directed to an automatic, independently functioning sparging apparatus for admixing a retardant and a reactant/reaction product mixture in a pressurizable reactor, and to methods for using the same.

The sparging apparatus is adapted for use with a conventional type reactor assembly. Such a reactor assembly characteristically utilizes a pressurizable vessel adapted to hold a liquid reaction mixture comprising reactants and reaction products. Pipe means are functionally associated with this vessel for controllably delivering such reactants to, and for removing such reaction products from, the vessel. In addition, mixing means is functionally associated with the vessel for controllably mixing such reactants and such reaction products within the vessel.

The reactor assembly with which the sparging apparatus of this invention is adapted to be used should further be equipped with retardant addition means for adding retardant to a liquid reactant/reaction product mixture in the pressurizable vessel.

The sparging apparatus functions in combination with such a reactor assembly. This apparatus uses a holder means for a supply of preferably substantially chemically inert (including insoluble) gas, as respects the liquid mixture of reactants and reaction products in a pressurizable vessel. A component of the holder means is a pressurizable reservoir for storing a supply of such inert gas. Another component of the holder means can be considered for descriptive purposes to be a gas delivery-means. The gas delivery-means includes a normally closed valve assembly for maintaining the inert gas supply intact until usage thereof is desired. Since such inert gas is typically stored at a pressure which is greater than the pressure at which such gas is used, the gas delivery-means usually also includes a pressure regulating means. Pipe or conduit means can also be considered part of the gas delivery-means to lead such inert gas from the reservoir to the interior regions of a pressurizable vessel.

The sparging apparatus also includes a nozzle or orifice means so that such inert gas can enter the interior of a pressurizable vessel in a desired predetermined pattern from conduit means. Preferably, the orifice means is below the level of any liquid reactant/reaction product mixture in such vessel so the bubbles of inert gas discharged from such orifice means will rise by gravitational and density factors up through such liquid mixture and thereby sequentially but locally displace the liquid mixture so as to agitate some.

Both to control the time when the sparging gas is released and to open the gas retainer valve, a convenient actuation means can be employed in the sparging apparatus actuation means used in any given embodiment, depending upon the particular vessel involved, the particular means used to introduce retardant into the liquid mixture in such vessel, and other related factors.

This invention also relates to an improved process for mixing a retardant with a liquid reactant/reaction product mixture in a pressurizable reactor vessel employing a controlled inert gaseous discharge into such mixture.

EMBODIMENTS

The following description is set forth to illustrate more clearly the principles and practices of this invention to one skilled in the art, and is not intended to be restrictive, but merely to be illustrative of the invention herein disclosed.

Turning to the drawings, there is seen in FIG. 1 a reactor assembly herein designated in its entirety by the numeral 10. The reactor assembly 10 includes a pressurizable vessel 11 which is adapted to hold a liquid reaction mixture 12 under some predetermined pressure. The liquid reaction mixture 12 comprises reactants and reaction products plus any other additives which may be present, such as diluents, catalysts, indicators, and the like. For controllably delivering such reactants to pressurizable vessel 11, there is associated with said vessel 11 at least one reactant feed line or pipe 13. For purposes of adding other materials, such as catalysts, and the like, to the interior of pressurizable vessel 11, there are provided additional feed lines appropriate to an individual situation, here illustrated by a catalyst feed line 14. Similarly, for controllably removing the reaction products from the pressurizable vessel 11, the reactor assembly 10 is conveniently fitted with at least one transfer line 16.

To prevent excessive localized hot spots from developing within pressurizable vessel 11 and to promote uniformity of reaction in liquid reaction mixture 12, the reactor assembly 10 is provided with a mixing means, herein designated in its entirety by the numeral 17. Although it can contain any convenient combination of elements, the mixing means 17 here is composed of a shaft 18 centrally mounted for rotational movements in pressurizable vessel 11 by means of bearings 19 and 21 mounted conveniently in axial alignment with one another in the top and bottom, respectively, of vessel 11. Rigidly noted on shaft 18 in spaced relationship to one another are shown a pair of impellers 22. In place of impellers 22, any of a wide variety of mixing devices known to the art may be employed on shaft 18. The upper end of shaft 18 extends through the top portion of pressurizable vessel 11 and makes functional connection with a powerhead 23, powerhead 23 being an electric motor, or the like. When the powerhead 23 is energized, shaft 18 is revolvably driven, and impellers 22 operate to mix the liquid reaction mixture 12 in pressurizable vessel 11.

Optionally, the pressurizable vessel 11 is equipped with at least one vent line 24 for safety reasons so as to provide an exit port from the vessel 11 in the event of either pressures within the vessel 11 exceeding preset design specifications, or in the event of over-filling vessel 11 as with a liquid reaction mixture 12, or the like.

Means (not shown) for controlling the operations of reactor assembly 10 are, of course, provided therefor, but since such are well known to the prior art, do not form a part of, and are not directly used in connection with, the present invention, such are not disclosed or described herein.

Such a reactor assembly 10 is equipped with retardant addition means. Although the present invention can be employed with any convenient form of retardant addition means (see, for example, the forms shown in U.S. Pat. 2,871,106 to Crowley et al. and in U.S. Pat. 3,131,033 to Van Volkenburgh), a preferred retardant addition means for use in combination with the present invention will now be described.

In FIG. 1, there is seen a pair of pressurizable reservoirs 26, each formed of steel, or the like, and adapted to hold a supply of reaction retardant chemicals 27 therein.

The reaction retardant chemicals 27 as such do not form part of the present invention. In general, such are well known to the prior art, and the choice of a particular one for a given situation depends upon the particular chemical reactants, the reaction products involved, and the type of retardant action desired. For example, an aqueous solution of sodium dimethyl dithiocarbonate and sodium polysulfide can be used to suppress a polymerization reaction involving butadiene and styrene to form synthetic rubber latex by an emulsion polymerization process.

Each reservoir 26 is equipped with a screw-type access plug 30, or the like, for convenience in filling with retardant chemicals 27 and in checking the quantity thereof in a reservoir 26. The bottom portion of each reservoir 26 is interconnected by a pipe 28 to a valve 29. Each valve 29 is in a normally closed configuration.

Each valve 29 (referring to FIG. 2) has a housing composed of a pair of mating halves 31 and 32 of metal which are conveniently clamped together by means of threaded studs 33 and nuts 34. Each half 31 and 32 combine to form a centrally disposed end threaded bore 37 which is adapted to receive at each threaded opposite end thereof a threaded metal pipe, in this instance, pipe 28 and pipes 36, respectively, in such fashion that pipes 28 and 36 are generally axially aligned with one another. Clamped transversely across bore 37 between halves 31 and 32 is a diaphragm 38. Diaphragm 38 is constructed, usually with scored lines therein, so as to rupture whenever a predetermined pressure is applied against the concave face 39 thereof. This predetermined pressure is chosen so as to be many times the normal pressures which will be applied against the convex face 41 thereof. Once the diaphragm 38 has been ruptured, it must be replaced to reclose the valve 29. In place of valve 29, one may employ any convenient valve construction having inlet and outlet ports and adapted to open rapidly in response to a predetermined pressure applied through such inlet port.

Each reservoir 26 is still further interconnected through its top portion by a pipe 42 to a source 43 shown here as a detachable cylinder of compressed, preferably inert (as respects mixture 12) gas, such as nitrogen, or the like, in which such gas is maintained under a pressure many times greater than the pressures occurring within the vessel 11 during a given reaction therein. In pipe 42 between pressurized gas source 43 and reservoir 26 is mounted a valve 44. Between valve 44 and source 43 is located a reduction valve assembly 50 which is conventional in construction and which functions to reduce the gas pressure existing in cylinder 43 to that desired in reservoir 26 after valve 44 is opened.

Each valve 44 is constructed in a manner similar to valve 29, except that valve 44 has a diaphragm 46 on which is secured an explosive charge 47. Charge 47 is detonatable by an electrical impulse transmitted thereto through wire 48 from a detonator 49. On detonation of charge 47, of course, the diaphragm 46 is ruptured. Observe that reservoir 26 is not pressurized until valve 44 is opened. In place of valve 44, one may employ any normally construction having inlet and outlet ports, and rapidly acting, externally actuatable actuation means for opening a passage from such inlet through such outlet ports.

The pipes 36 interconnect with a plurality of valves 51. Each valve 51 is physically located and mounted relative to vessel 11 either so as to have its outlet port vent into the liquid reaction mixture 12 (in which event the pipe 36 may pass through the wall of vessell 11), or so as to have its outlet port adjacent a surface of mixture 12 (as when a valve 51 is mounted over an aperture 52 formed in the wall of vessel 11). Valves 51 are in spaced relationship to one another. Preferably, the spacing is such that substantially all interior regions of the liquid reaction mixture 12 are within range of the orifice regions 53 of each valve 51 at a given predetermined pressure of retardant chemicals 27 entering liquid reaction mixture 12 therefrom.

As those skilled in the art will readily appreciate, the orifice region 53 of a given valve 51 is so designed as to control or influence the pattern of a fluid discharge therefrom (that is, of reactor retardant chemicals 27) under the predetermined conditions involved in a given reactor assembly 10. For example, referring to FIG. 4, a venturi nozzle 54 can be provided in a valve 51 to aid in dispersing retardant chemicals in mixture 12.

In general, the construction of a valve 51 can be similar to that of a valve 29, though any convenient and equivalent form of valve construction can be used.

A thermocouple 56 mounted inside vessel 11 in rod 57 is conveniently used to monitor or sense temperature conditions existing in the liquid reaction mixture 12. Although thermocouple 56 here serves as the sensing unit to detect the predetermined or preset conditions when the embodiment of the invention shown in FIGS. 1–4 will become operative and function to discharge and mix retardant chemicals 27 with mixture 12 in vessel 11, as those skilled in the art will appreciate, more than one form or type of sensing unit may be employed in a given embodiment of the invention, or a different form or type of sensing unit may be employed in such a given embodiment. Examples of suitable sensing units include pressure sensitive transducers, infra-red sensors, ultra-violet sensors, and the like.

Thermocouple 56 feeds an electric signal output to a control center 58. In this embodiment, the control center is a thermostat. Whenever thermocouple 56 produces an electric signal output in excess of a predetermined valve, indicating a corresponding predetermined temperature has been exceeded, control center 58 signals detonator 49 and explosive charge 47 is detonated. This ruptures the diaphragm 46 in such valve 44 and opens valve 44.

Reservoir 26 is thus pressurized by gas from source 43 to a predetermined pressure chosen to be well in excess of any pressure existing in vessel 11. The thus pressurized retardant chemicals 27 then immediately rupture both valves 29 and 51, and the retardant chemicals 27 are discharged and injected from valves 51 into liquid reaction mixture 12 independently of whether or not mixing means 17 is inoperative, partially operating, or fully operating.

Preferably, the outlet port of each valve 51 so constructed that the pressure of reactant retardant chemicals 27 passing through such outlet port of valve 51 is within 10% of (and most preferably is approximately equal to) the pressure applied to the reactant retardant chemicals 27 in reservoir 26. Usually in order to produce such a pressure relationship, it is desirable to construct the outlet port of valve 51 so as to have a constriction therein, otherwise the pressure drop between valve 44 and valve 51 is greater than such preference.

Also preferably, the gas capacity of source 43, and/or the volume of reaction retardant chemical 27 in reservoir 26, are/is so chosen that vessel 11 is neither over pressurized nor over filled with material which would initiate, in the usual reactor assembly 10, the functioning of vent line 24.

Observe that valves 51, 29 and 44 can be regarded as coacting together to provide a deluge valve assembly for this embodiment of the reaction retarding apparatus.

In FIGS. 5 and 6, there is seen an alternative embodiment of such preferred retardant addition means for use with the sparging technique of this invention. Certain parts of this embodiment are similar to those parts in the embodiment of FIGS. 1–4 and are similarly numbered except that prime marks are added thereto for convenience and reference purposes. In this embodiment, cylinders 61 hold a reaction retardant chemical 27', and this chemical 27' is pressurized by an inert gas charged to the cylinder 61. Each cylinder 61 is interconnected by means of an appropriate conduit means 60 to a valve assembly 62. The construction of valve assembly 62 is similar to that used in the construction of valve assembly 44 described above. Each combination of cylinder 61, a conduit 60 and a valve 62 can be considered to be an integral assembly which is detachably secured by means of an appropriate threading arrangement either to a pipe 65 whose orifice vents into the interior of a vessel 11, or to a pipe 66 which terminates in a normally closed valve assembly 51' (whose construction is like that of vessel 51 described above). When thermocouple 56' senses a deviation from a normal operating condition, control center 58' signals detonators 64 which in turn detonate explosive charges (not shown) in each valve assembly 62, thereby opening each such valve assembly 62. The result is that the contents of each cylinder 61 are discharged into the interior of vessel 11'. Observe that as soon as valve 51' is pressurized, the diaphragm therein ruptures and reaction retardant chemical 27' enters reaction mixture 12'. Pressure conditions, volumes of reaction retardant chemicals employed, etc. are generally as described above in reference to the embodiment of FIGS. 1–4.

Sometimes it is desirable to use a reaction retardant chemical 27 which is in a solid, finely divided form. Such a solid, finely divided material can be injected using the teachings and principles of this invention. It is preferred, if the solid is a low melting one, such as sulfur, or the like, to heat the reservoir and place such solid in a liquid form. Thus, in the embodiment shown in FIG. 5, there is illustrated a reservoir 61 which is wrapped with a heating coil 63 suitable for maintaining contents within reservoir 61 at a predetermined temperature.

In FIG. 1 there is seen a gas reservoir 66 in which is maintained a supply of substantially inert gas, such as nitrogen, helium, argon, or the like. Pipe 67 inner-connects the reservoir 66 with a check valve 68. Check valve 68 permits the oneway flow of gas from holder 66 past check valve 68 into pipe 69. In pipe 67 between valve 68 and reservoir 66 is a pressure reducing valve 70 adapted to drop gas pressures in reservoir 66 to some predetermined lower pressure at which the inert gas is to be fed into vessel 11. Such lower pressure is generally at least somewhat above pressures normally existing in the interior of vessel 11.

Pipe 69 inter-connects check valve 68 with pipe 36. Valves 51 in their normally closed configuration prevent gas from holder 66 from entering vessel 11 and liquid mixture 12.

However, whenever the reactant retardant chemical 27 enters pipe 36 and ruptures valves 51, gas in holder 66 can flow into liquid mixture 12 as soon as the retardant 27 has emptied into liquid mixture 12. The supply of gas in cylinders 43 is preferably selected so as to become exhausted as soon as the retardant chemical 27 has been exhausted into the liquid mixture 12. Entry of retardant chemical 27 into holder 66 is prevented by check valve 68.

In effect, the retardant apparatus of FIGS. 1–4 thus provides an actuation means which starts the operation of the automatic sparging apparatus embodiment shown in FIG. 1.

In FIGS. 5 and 6 there is seen an alternative embodiment of a sparging apparatus of the present invention. In this embodiment the sparging apparatus is separate from the reaction retardant apparatus. Here, a gas holder 73 with a supply of substantially inert gas is interconnected by means of a pipe 74 to a normally closed valve 76. Valve 76 is constructed similarly to valves 62 with appropriate modification to control and handle a gas. In turn, the valve 76 is connected by pipes 77 to vessel 11' through ports 78. By maintaining holder 73 above, the level of liquid mixture 12' in vessel 11', and by using the valve 76 to prevent the flow of liquid backwards through pipes 77 into the holder 73 when the sparging apparatus is not in operation, the need for valves at port 78 is eliminated, although such can be used if desired. In this embodiment, valve 76 is opened with any explosive at the same time that valves 62 are opened, all by control means 58' when control means 58' is signaled by thermostat 56'. Gas is thus discharged from ports 78 concurrently with the injection of retardant chemicals into liquid mixture 12 from ports 80.

In order to control the manner in which gas is discharged either from orifices 52 (referring to FIG. 1) or from orifices 78 (referring to FIG. 5), it will be appreciated by those skilled in the art that constrictions or nozzles (not shown) can be used. It will also be appreciated by those skilled in the art that inert gas can be discharged in accordance with the teachings of this invention from a relatively large number of different point or locations within the interior of vessel 11 or 11' as desired in an individual situation.

In general, the volume of inert gas used is chosen so as to be sufficient to effectuate a predetermined desired degree of mixing between retardant chemicals and liquid mixture in a reactor vessel particularly in the event that mixing means 17 or 17' is inoperative. If such means is operative at the time when reaction retardant chemicals are added to a vessel 11 or 11', then mixing of retardant chemicals 27 or 27' with liquid 12 or 12' will take place at a greater rate usually than is the case when mixing means 17 or 17' is not operative. Since the degree of mixing needed in a given situation is obviously specific to the equipment used, chemical composition of retardant and reaction mixtures, and related factors, it is not practical or possible to give definite values on the degree of mixing which must be achieved in any given situation. The present invention, however, does provide an extremely reliable and effective means for achieving such mixing to a desired extent such as was not heretofore known to the prior art.

The process of the present invention involves sparging a combination of a mixture of reactant/reaction products plus a retardant chemical with an inert gas using a pressure somewhat above those pressures already existing in a reactor vessel.

In a preferred embodiment, the process of this invention is practiced by first injecting (referring, for example, to FIG. 1) a retardant chemical into a vessel 11 through valves 51 from reservoirs 26 and thereafter (either simultaneously with or following such injection) sparging using an apparatus embodiment of this invention, the combination of retardant chemical and liquid mixture 12 in vessel 11. Preferably, at the time that a reaction retardant chemical is thus injected, the pressure on the reactant retardant chemical is at least twice greater than pressures existing in the interior of the vessel 11 and preferably at least 5 times greater than such pressures. The process sequence of steps involves sensing as through thermocouple 56 a deviation from a predetermined normal operating condition in vessel 11, opening valve 44 thereby pressurizing retardant chemical 27 in reservoirs 26. Such pressurization in turn ruptures the diaphragms of valves 29 and 51 and allows the fluid 27 to be injected into mixture 12 and vessel 11.

After the reaction retardant chemical has been injected into vessel 11, the automatic sparking apparatus operates to achieve mixing of retardant chemical with liquid mixture 12 in the desired manner.

What is claimed is:
1. In a pressurized reactor vessel adapted to contain a liquid reactant/reaction product mixture and having:
 (A) reaction retardant material reservoir means,
 (B) normally closed valve means functionally located with respect to said reactor vessel as to be dischargable when opened into said reactor vessel,
 (C) pipe means interconnecting said reservoir means with said valve means,
 (D) detection means for sensing a predetermined deviation from a normal operating condition existing in said reactor vessel, and
 (E) control means for opening said valve means responsive to said detection means,
the improvement which comprises an automatic sparging apparatus adapted to commence functioning only when a reaction retardant material is discharged from said reservoir means, said automatic sparging apparatus comprising:
 (A) holder means for a supply of substantially inert gas including normally closed valve means, and means for delivering such supply at a pressure above those pressures existing in said reactor vessel,
 (B) normally closed conduit means, including orifice means, for conducting such supply from said holder means to at least one interior region of said reactor vessel which is below the normal level of a liquid mixture of reactants and reaction products therein and for releasing such supply in the form of bubbles in such liquid mixture, and
 (C) actuation means for opening said normally closed conduit means whenever said reactor retarding apparatus operates to release reaction retardant material into said reactor vessel, and
 (D) relief valve means functionally associated with said reactor vessel and located above the normal level of a liquid mixture of reactants and reaction products therein.

2. In an automatic, independently functioning reaction retarding apparatus adapted for use with a pressurized reactor vessel, said apparatus including:
 (A) pressurizable reaction retardant material reservoir means,
 (B) a plurality of normally closed valve means each of which is so functionally located with respect to said reactor vessel as to be dischargable when opened into a generally different interior portion of said reactor vessel,
 (C) pipe means interconnecting said reservoir means with each of said valve means,
 (D) detection means for sensing a predetermined deviation from a normal operating condition existing in said reactor vessel,
 (E) control means for opening each of said valve means responsive to said detection means, and
 (F) pressurizing means, including conduit means interconnecting said pressurizing means with said reservoir means, said pressurizing means being adapted to apply pressures for a limited period substantially in excess of those normally existing within said reactor vessel when such is operating but sufficient to deliver into said vessel at such pressures a predetermined quantity of reaction retardant material,
the improvement which comprises an automatic sparging apparatus adapted to commence functioning only when a reaction retardant material is discharged from said reaction retarding apparatus, said automatic sparking apparatus comprising:
 (A) holder means for a supply of substantially inert gas including normally closed valve means, and means for delivering such supply at a pressure intermediate between those pressures existing in said reactor vessel and those pressures applied by said pressurizing means, (B) normally closed conduit means including orfice means for conducting such supply from said holder means to at least one interior region of said reactor vessel which is below the level of a liquid mixture of reactants and reaction products therein and for releasing such supply in the form of bubbles in such liquid mixture, and (C) actuation means for opening said normally closed conduit means whenever said reactor retarding apparatus operates to release reaction retardant material into said reactor vessel.

3. In a process for adding a retardant chemical to a pressurized liquid reactant/reaction product mixture involving the addition of such retardant chemical to such mixture, the improvement which comprises the steps of sparging the resulting combination of a mixture and a retardant chemical with an inert gas using a pressure above those pressures already existing in a said mixture.

4. In a process for adding a retardant chemical to a pressurized liquid reactant/reaction product mixture, the improvement which comprises the steps of:

(A) injecting such retardant chemical at a plurality of different sites in said mixture while maintaining a pressure at each site which is greatly in excess of that already existing in a said mixture, and (B) sparging the resulting combination of said mixture and said retardant chemical with an inert gas using a pressure intermediate between those pressures already existing in a said mixture and those pressures employed in said injecting.

References Cited

UNITED STATES PATENTS

| | | | |
|---|---|---|---|
| 2,317,836 | 4/1943 | Weaver | 169—4X |
| 2,693,240 | 11/1954 | Glendinning et al. | 169—4X |
| 2,871,106 | 1/1959 | Crowley et al. | 169—4X |
| 3,103,296 | 9/1963 | Gour | 169—4X |
| 3,131,033 | 4/1964 | Volkenburgh | 23—285X |
| 3,174,550 | 3/1965 | Bugg | 169—4X |

OTHER REFERENCES

Fair, "Designing Gas-Sparged Reactors," Chem. Eng. 74:67–74 (1967).

JOSEPH SCOVRONEK, Primary Examiner

D. G. CONLIN, Assistant Examiner

U.S. Cl. X.R.

23—285, 290; 169—4; 260—695, 700, 95